United States Patent
Pamulaparthy et al.

(10) Patent No.: US 8,816,695 B2
(45) Date of Patent: Aug. 26, 2014

(54) METHOD AND SYSTEM FOR INTEROPERABILITY TESTING

(75) Inventors: Balakrishna Pamulaparthy, Secunderabad (IN); Anuradha Charugalla, Rajahmundry (IN)

(73) Assignee: General Electric Company, Schenectady, NY (US)

( * ) Notice: Subject to any disclaimer, the term of this patent is extended or adjusted under 35 U.S.C. 154(b) by 377 days.

(21) Appl. No.: 12/912,928

(22) Filed: Oct. 27, 2010

(65) Prior Publication Data

US 2012/0105074 A1     May 3, 2012

(51) Int. Cl.
    *G01R 31/04*     (2006.01)
    *G06F 19/00*     (2011.01)
    *H04L 12/26*     (2006.01)

(52) U.S. Cl.
    CPC ................................. *H04L 12/2697* (2013.01)
    USPC .......................................... 324/538; 702/122

(58) Field of Classification Search
    CPC .... H04L 12/2697; H04L 69/169; Y04S 10/18
    USPC .............. 324/538; 702/702, 58; 370/248, 538
    See application file for complete search history.

(56) References Cited

U.S. PATENT DOCUMENTS

| | | | | |
|---|---|---|---|---|
| 6,671,635 | B1 * | 12/2003 | Forth et al. | 702/61 |
| 8,037,173 | B2 * | 10/2011 | Tuckey et al. | 709/224 |
| 2002/0173927 | A1 | 11/2002 | Vandiver | |
| 2008/0183406 | A1 * | 7/2008 | Lee et al. | 702/58 |
| 2009/0070051 | A1 | 3/2009 | Vetter et al. | |
| 2009/0070062 | A1 * | 3/2009 | Kirrmann et al. | 702/122 |
| 2010/0256832 | A1 * | 10/2010 | Kirrmann et al. | 700/293 |
| 2011/0196627 | A1 * | 8/2011 | Steinhauser et al. | 702/58 |

FOREIGN PATENT DOCUMENTS

WO    WO 2009007228 A1 *   1/2009

* cited by examiner

*Primary Examiner* — Jermele M Hollington
*Assistant Examiner* — Hoang X Nguyen
(74) *Attorney, Agent, or Firm* — Dority & Manning, P.A.

(57) ABSTRACT

A method and system for interoperability testing is provided. Various network communications messages are sent to a device under test (DUT) and a number of similar devices from different sources including different manufacturers. Responses to the test signals from the device under test and the similar devices are compared to expected responses in accordance with the standard, and adjustments are made in the device under test if deviations in responses are detected. The device under test may be a intelligent electronic device or IEC 61850 protocol client device.

15 Claims, 3 Drawing Sheets

METHOD AND SYSTEM FOR INTEROPERABILITY TESTING

FIELD OF THE INVENTION

The present subject matter relates to substation equipment testing including Intelligent Electronic Devices, Substation Manager, and Relays. More specifically, the present subject matter relates to testing systems and methods to achieve multi-vendor interoperability with IEC 61850 protocol.

BACKGROUND OF THE INVENTION

The IEC 61850 Standard, Communications Networks and Systems in Substations, is an internationally recognized data communications suite of protocols for substation and system-wide protective relaying, integration, control, monitoring, metering, and testing. Currently IEC 61850 is the only substation protocol standard in substation automaton systems (SAS) that has high visibility in Smart Grid environments where, according to an IEEE survey, more than 200 countries have already accepted the standard. With multi-vendor installations, developers and users recognize the risk of varying interpretations of such a complex standard. Standard conformance testing and certification by test laboratories, carried out with standardized procedures and tools by experts who are not the designers of the equipment under test, can remove much of the risk and can bring a common understanding of how to implement communications so that all products work together.

It is understood, however, that device certification as compliant to the IEC 61850 standard does not guarantee 100% interoperable with other third-party devices, even though they themselves may also be certified as compliant. For example, interactions among otherwise compliant devices may be corrupted by design variables that are not specified or are only partly specified in the standard such as timing issues.

In theory, if the standard is clear in every detail and all the Intelligent Electronic Devices (IEDs) to be employed in a system have been conformance tested for all relevant services, then one would expect the IEDs to interoperate flawlessly.

If all the IEDs employed in a system are from the same development team, interoperation will likely be satisfactory. However, if the test combines IEDs from different manufacturers, or even different development locations of a single manufacturer, there is a chance that some standard specification interpretation differences will arise. This may be true especially if the relevant industry conformance testing program is in its early stages or if the standard is vague or silent on some necessary technical issues.

Most of the interoperability test procedures available today will connect two or more devices, for example, relays, and/or IEDs to a LAN and stimulate them to exchange IEC 61850 messages and exercise their interactive behavior. There are, however, no stringent methods presently available that can test interoperability under performance or loading conditions including client-server interoperability and common device configuration. In fact, interoperability testing is not within the scope of the IEC 61850 standard.

Devices that have passed conformance testing may still be subject to issues during integration, commissioning, and operation. Conformance testing is simply not equivalent to and should not be a replacement for interoperability testing.

US Patent Application Publication US20020173927 A1 to Vandiver discloses a "System For Testing Of Intelligent Electronic Devices With Digital Communications." The test system provides conventional analog outputs that allowing application of power system conditions simulation to a device under test.

US Patent Application Publication US20090070051 A1 to Vetter et al. discloses an "Intelligent Electronic Device Configuration Verification" system that is described as a substation automation testing tool for IEC 61850 compliant substations.

In view of these known concerns there remains a need for accurate, reliable, flawless, automated and stringent interoperability test methods or procedures for the IEC 61850 standard.

BRIEF DESCRIPTION OF THE INVENTION

Aspects and advantages of the invention will be set forth in part in the following description, or may be obvious from the description, or may be learned through practice of the invention.

The present subject matter relates to a method for testing interoperability of electronic devices comprising configuring a device under test (DUT) and a plurality of similar devices for network communication over at least one network under a common protocol standard. The communications capabilities between the DUT and each of the plurality of similar devices are sequentially tested individually and communications capabilities between at least two of the similar devices are tested. The communications capabilities test results are compared with expected results under the common protocol standard and corrections are made to the DUT if any communications capabilities deviations are observed within the DUT.

The method may also include transmitting at least one network message to the DUT and the plurality of similar devices, comparing responses to the at least one network message from the DUT and the plurality of similar devices with expected results under the common protocol standard and correcting any network message deviations observed within the DUT. In some embodiments of the present subject matter, at lease some of the plurality of similar devices is obtained from sources different from that of the DUT. In some embodiments, the transmitted network message may be transmitted from a Generic Object Oriented Substation Event (GOOSE) transmitter.

In specific embodiments, the DUT is an intelligent electronic device (IED). In other embodiments, the DUT may be a Client device. In specific embodiments, the common protocol standard may be the IEC 61850 Standard. In selected embodiments, test results may be captured using a network analyzer for comparison with expected results under the common protocol standard. In selected embodiments of the present subject matter, a redundant network may be provided and communications capabilities test results from the redundant network may be compared with expected results under the common protocol standard.

In specific embodiments of the present subject matter, a plurality of client devices may be provided where each client device is configured as a master device, commands are issued from each of the plurality of client devices and a determination is made as to whether the DUT responds in the same manner as any of the plurality of similar devices to any of the plurality of client devices.

The present subject matter also relates to a system for interoperability testing including a network, a device under test (DUT), a plurality of devices similar to the DUT, a transmitter, and a network analyzer. The DUT and similar devices are all configured for network communication over the network under a common protocol standard. The transmitter is configured to transmit network messages to the DUT and the plurality of similar devices. The network analyzer is configured to monitor responses from the DUT and the similar devices and to compare the responses to expected responses based on the network protocol.

If the network analyzed detects deviations in the responses from the DUT that differ from the expected responses, correction may be made to the DUT to insure that the DUT provides proper responses so that the DUT may be adjusted to insure proper interoperability within a network that may be populated with devices from diverse sources or manufacturers. In certain embodiments, the device under test may correspond to an intelligent electronic device or a IEC 61850 standard client.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which.

Figure 1:
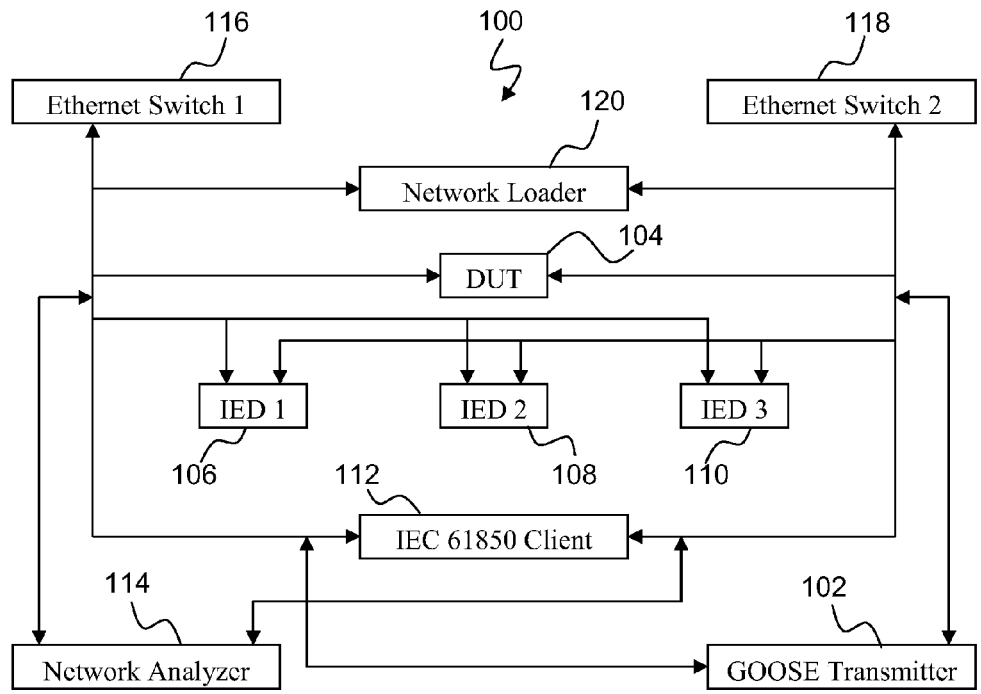
FIG. 1 provides a configuration for a peer-to-peer interoperability test.

Repeat use of reference characters throughout the present specification and appended drawings is intended to represent same or analogous features or elements of the invention.

DETAILED DESCRIPTION OF THE INVENTION

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

As noted in the Summary section, the present subject matter is directed toward interoperability testing within an IEC 61850 protocol environment, that is an environment relating generally to electrical substation architecture and system-wide protective relaying, integration, control, monitoring, metering, and testing. The test methods disclosed herein in accordance with present technology have been designed for use by vendors who designs IEC 61850 compliant devices as a mechanism whereby they can be more competitive in the market. In general, the present subject matter focuses on how to test a device under test (DUT) for protection and control functions that ensure maximum interoperability, correct performance, and generation of appropriate Client-Server communications as per IEC 61850 Standard.

With reference now to FIG. 1, consideration is given to an example test setup 100 for Peer-to-Peer Interoperability testing. A Generic Object Oriented Substation Event (GOOSE) transmitter 102 is configured to publish messages in a geometric progression interval with every message having a Time Allowed Live (TAL) attribute after which the message will die. As is understood by those of ordinary skill in the art, GOOSE transmitters provide predefined messages that describe power substation status and events. Network Loader 120 is configured to generate/simulate ethernet traffic by generally simulating Analog, Digital and Accumulator state change events over a predefined simulation rate, publishing some random messages etc.

After an event is generated, GOOSE transmitter 102 sends messages to one or more receivers, for example a device under test (DUT) 104, Intelligent Electronic Devices (IEDs) 106, 108, 110, and to other components via Ethernet Switches 116, 118 continuously in time intervals calculated based on a geometric progression until a new event is generated where it will again start the progression. This method ensures higher reliability in protection and control applications and maintains synchronization between the devices. In the present example, IEDs 106, 108, 110 may correspond to Intelligent Electronic Devices obtained from different vendors or different developers while DUT 104 may correspond to a device under test developed by a current manufacturer wishing to determine whether DUT 104 is fully compliant under appropriate standards as well as with devices from other manufacturers.

During testing for example, if it is observed, for example by Network Analyzer 114, that DUT 104 is following a sequence of progression corresponding to 11, 23, and 44 ms while and all other IEDs 106, 108, 110 are following a progression corresponding to 10, 20, and 40 ms, then it can be observed that the DUT 104 initial message is published after 11 ms instead of 10 ms. Were this timing offset to occur in the field, the offset would be accumulated in time over thousands of cycles until the entire progression is delayed to a point where DUT 104 loses synchronization with IEDs 106, 108, 110. Accordingly, because the timing offset can be accurately measured using the above described test methodology, the TAL can be corrected before being installed in the field.

Figure 2:
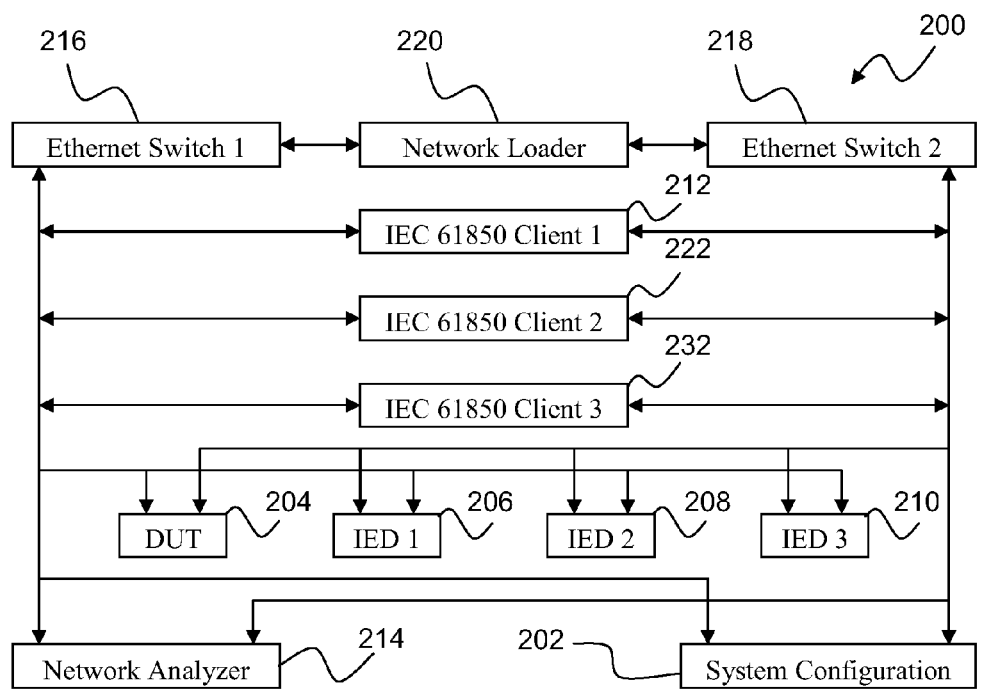
FIG. 2 provides a configuration for a Client-Server interoperability test.

With reference now to FIG. 2, consideration is given to an example test setup 200 for Client-Server Interoperability testing. For Client-Server Interoperability a client, for example one of clients 212, 222, 232 or a client-server device under test (DUT) 204 would like to create a persistent dataset in a server. In a manner similar to that described with respect to FIG. 1, some or all of IEDs 206, 208, 210, as well as some or all of IEC 61580 Clients 212, 222, 232 may correspond to Intelligent Electronic Devices and Client devices obtained from different vendors or different developers while DUT 204 may correspond to a device under test developed by a current manufacturer wishing to determine whether DUT 204 is fully compliant under appropriate standards as well as with devices from other manufacturers.

Generally a client creates a dataset in server by grouping points from server data points and by assigning a name to the points such as "Dataset 1." In the instance that a client attempts to create a dataset and to give that dataset a particular name, the client should receive a response from the server that an "Object-Exists" if there exists a dataset already in the server with the same name created by another client. This is one such kind of example for client-server test, there may exist 'n' number of tests like this.

When testing DUT 204 under such circumstances, it gives an incorrect response, corrections can be made based on responses from other IEDs. By employing this methodology, every operational feature can be tested with multiple devices to ensure maximum interoperability and correctness of operation. As most of the substations planned to be built in the future will be based on IEC 61850 standard with devices supplied from multiple vendors, it is important that a stable, automated and reliable interoperability test procedure both at vendor site and during FAT (Factory Acceptance Test) be available.

One of the significant benefits of the IEC 61850 standard is that it is a nonproprietary, international communications standard that includes a suite of protocols to partially satisfy three of the many necessary functions. These include protocols relating to Peer-to-peer, Client-Server, and Device Configuration relationships. A typical interoperability test method should, therefore, test all three of these functions with different vendor devices, as opposed to simply testing for exchanging messages between devices.

Figure 3:
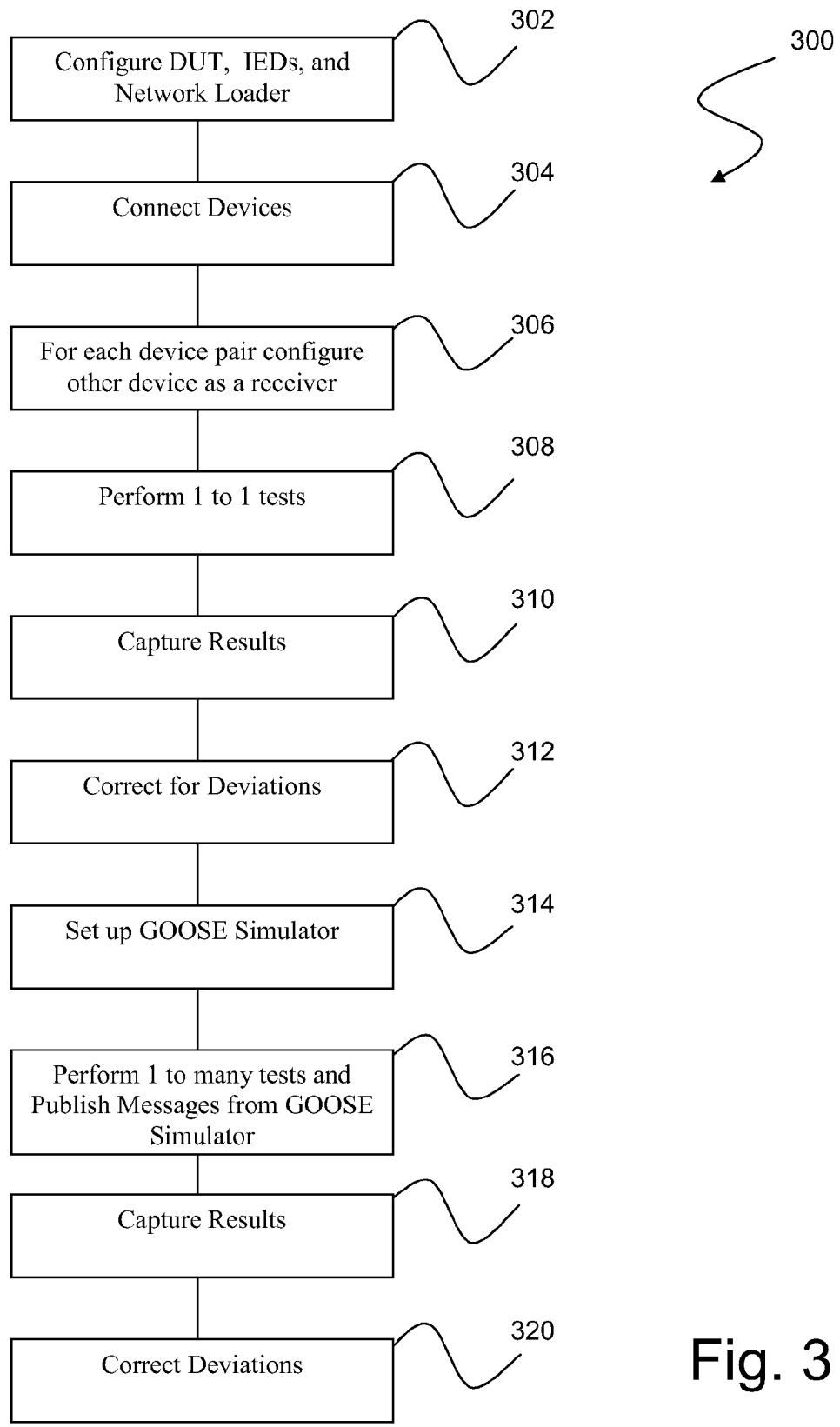
FIG. 3 is a flow chart illustrating exemplary steps in performing a peer-to-peer interoperability test.

In accordance with present technology, methodology has been developed to perform these multiple tests. Referring to FIGS. 1 and 3, there is illustrated a flow chart illustrating exemplary steps in performing a peer-to-peer interoperability test 300.

In a first step 302, a device under test (DUT) 104 and a number of IEDs 106, 108, 110 are configured using an appropriate configuration file. In this step a Network Loader 120 is also configured to generate Ethernet traffic.

In a second step 304, all of the devices are connected on a redundant LAN Switches 116, 118. Care should be taken to insure that connections are established between all IEDs 106, 108, 110 and DUT 104. DUT 104 and IEDs 106, 108, 110 are configured to report AI, DI, and ACC events at configured simulation rate continuously to IEC 61850 client 112.

At step 306, in each device configure other device as receiver using MAC address.

At step 308, for each of the important one-to-one tests, perform each test in automated manner one after the other between DUT 104 and IED 106, DUT 104 and IED 108, DUT 104 and IED 110, IED 106 and IED 108 and IED 108 and IED 110 in sequence.

At step 310, capture the test results using Network Analyzer 114 and compare each result with other sets of results and expected/predicted results from the IEC 61850 Standard. Results obtained on redundant networks or different subnet masks channels should be the same.

In step 312, if deviations are observed with respect to DUT 104, correct the deviations within DUT 104.

At step 314, set up GOOSE Simulator 102 with all devices configured as receivers.

At step 316, for all one-to-many tests, publish messages from GOOSE Simulator 102 and look for how each IED 106, 108, 110 and DUT 104 respond to the messages from GOOSE Simulator 102 using Network Analyzer 114.

In step 318, capture the results and compare each result with other sets of results and expected/predicted result from the IEC 61850 Standard. Look for any deviations.

Finally, in step 320, if deviations are observed with respect to DUT 104, correct the deviations within DUT 104.

Figure 4:
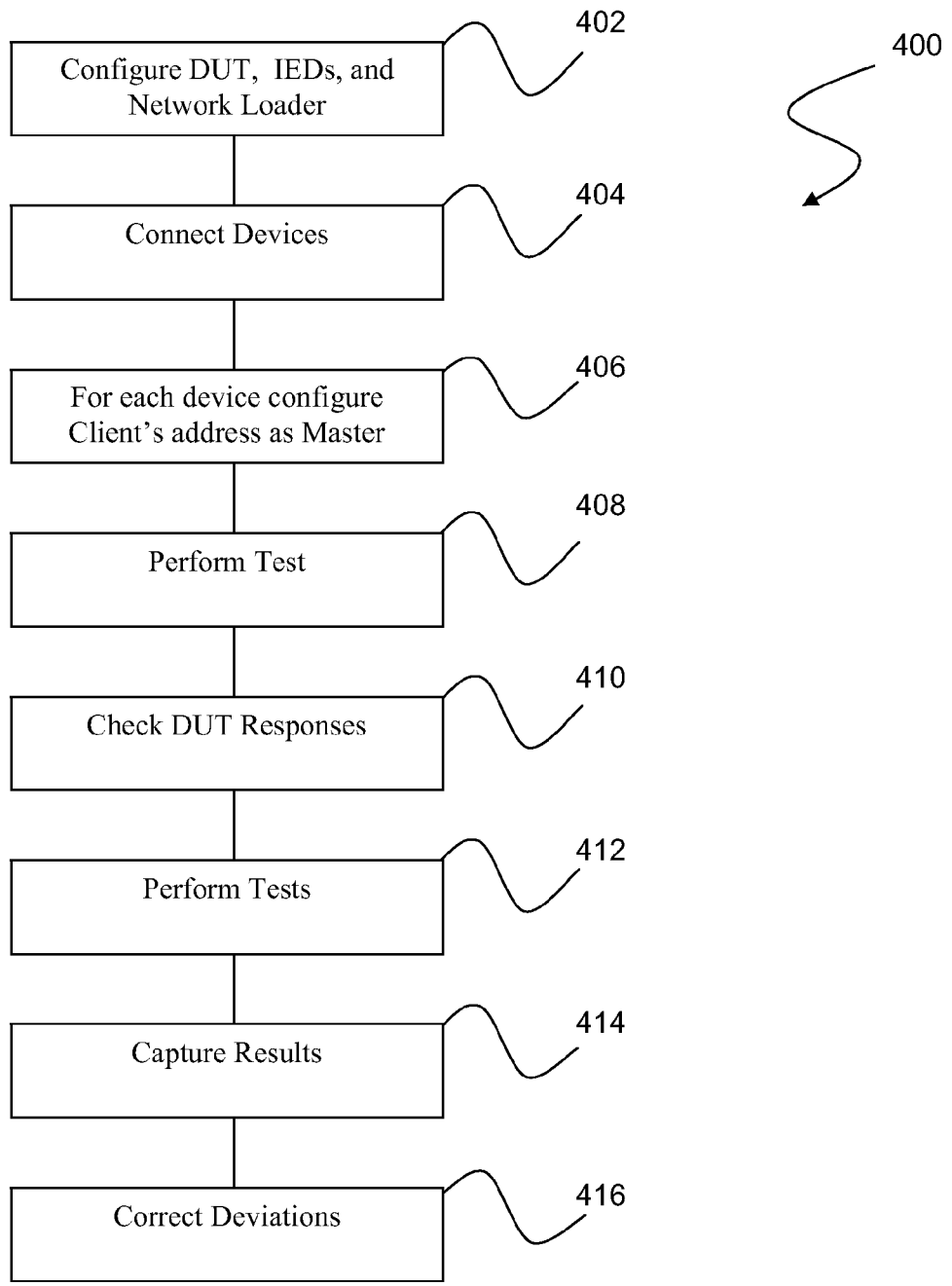
FIG. 4 is a flow chart illustrating exemplary steps in performing a Client-Server interoperability test.

Referring to FIGS. 2 and 4, there is illustrated a flow chart illustrating exemplary steps in performing a Client-Server Interoperability test 400.

In this Client-Server Interoperability test 400, at step 402, DUT 204 and IEDs 206, 208, 210 are configured with the same configuration file. Network Loader 220 is also configured to generate Ethernet traffic.

At step 404 all the devices 204, 206, 208, 210 are connected on a redundant LAN Switch 216, 218 making certain that connection is established between IEDs, 206, 208, 210, and DUT 204 with Clients 212, 222, 232.

In step 406, in each device 204, 206, 208, 210 configure Client's 212, 222, 232 addresses as Master.

In step 408, from each Master client 212, 222, 232 issue control of each type, each Control model type and look for feedback responses from each device 204, 206, 208, 210.

In step 410, check whether DUT 204 responds in the same manner as any other IED 206, 208, 210, to any Client 212. 222. 232.

In step 412, perform tests on Reporting, Logging, Data update, Quality update, Data processing, and other test as desired from each Client 212, 222, 232 to each device 204, 206, 208, 210.

At step 414, capture the results using Network Analyzer 214 and compare each result with other sets of results and expected/predicted results from the IEC 61850 Standard. Look for any deviations.

At step 416, if deviations are observed with respect to DUT 204, correct the deviations within DUT 204.

The testing methodologies described herein provide a number of advantages. Presently the IEC 61850 standard is the only standard approved that could meet Smart Grid Initiative requirements. As is known, most IEC 61850 Substations uses multi-vendor devices; hence interoperability is a must-have feature for any such substation. The present technology, being both robust and reliable, well addresses these concerns.

In certain tests all the devices 104, 106, 108, 110, 204, 206, 208 & 210 may be configured with same device configuration file or ICD file and perform similar tests on all IEDs to ensure that DUT shall behave in same manner as every other IED with respect to configuration.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A method for testing interoperability of electronic devices, comprising:
    configuring a device under test (DUT) from a first source or manufacturer and a plurality of similar devices from one or more different sources or manufacturers for network communication over at least one network under a common protocol standard;
    sequentially testing communications capabilities between the device under test and each of the plurality of similar devices individually, wherein the communications capabilities are related to any one of or a combination of the following: exchanging common protocol messages and exercises, protection functions, control functions, or synchronization functions;
    testing communications capabilities between at least two of the plurality of similar devices under the common protocol standard;
    comparing each communications capabilities test result of the DUT with the plurality of similar devices and the test results between the similar devices with expected results under the common protocol standard; and correcting any communications capabilities deviations observed between the device under test and the expected results under the common protocol standard, and between the device under test and compatibility with the other similar devices.

2. The method of claim 1, further comprising:
transmitting at least one network message to the device under test and the plurality of similar devices;
comparing responses to the at least one network message from the device under test and the plurality of similar devices with expected results under the common protocol standard; and
correcting any network message deviations observed within the device under test.

3. The method of claim 1, wherein at least some of the plurality of similar devices are obtained from sources different from that of the device under test.

4. The method of claim 1, wherein the device under test is an intelligent electronic device (IED).

5. The method of claim 1, wherein the device under test is a Client device.

6. The method of claim 1, wherein the common protocol standard is the IEC 61850 Standard.

7. The method of claim 2, wherein transmitting comprises transmitting at least one message from a Generic Object Oriented Substation Event (GOOSE) transmitter.

8. The method of claim 7, wherein transmitting comprises transmitting a plurality of messages from the GOOSE transmitter.

9. The method of claim 1, wherein comparing comprises capturing test results using a network analyzer for comparison with expected results under the common protocol standard.

10. The method of claim 1, further comprising:
providing a redundant network; and
comparing communications capabilities test result from the redundant network with expected results under the common protocol standard.

11. The method of claim 1, further comprising:
providing a plurality of client devices each configured as a master device;
issuing commands from each of the plurality of client devices; and
determining whether the device under test responds in the same manner as any of the plurality of similar devices to any of the plurality of client devices.

12. The method of claim 1, further comprising:
determining that communications connections are established between the RELIT and each of the similar devices.

13. The method of claim 1, wherein configuring comprises configuring selected devices as receivers using MAC addresses.

14. A system for interoperability testing, comprising:
a network;
a device under test from a first source or manufacturer;
a plurality of devices from one or more different sources or manufacturers similar to said device under test, the device under test and said plurality of similar devices all being configured for network communication over said network under a common protocol standard;
a transmitter configured to transmit network messages to at least said device under test and said plurality of similar devices; and
a network analyzer,
wherein said network analyzer is configured to monitor responses from said device under test and each of said similar devices, and between at least two of said similar devices, wherein the responses are related to any one of or combination of the following; exchanging common protocol messages and exercises, protection functions, control functions, or synchronization functions, and to compare the responses to each other and an expected response based on the network protocol,
whereby detection of deviations observed between the device under test and the expected results under the common protocol standard, and between the device under test and compatibility with said similar devices permits correction of any communications capabilities deviations observed within the device under test.

15. The system of claim 14, wherein said device under test is one of an intelligent electronic device or a IEC 61850 standard client.

* * * * *